United States Patent

Okamoto et al.

(10) Patent No.: US 10,461,468 B2
(45) Date of Patent: Oct. 29, 2019

(54) CONNECTOR MOUNTING STRUCTURE AND CONNECTOR MOUNTING METHOD

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Ryouya Okamoto, Mie (JP); Hiroki Hirai, Mie (JP); Tetsuji Tanaka, Mie (JP); Hiroshi Shimizu, Mie (JP); Hitoshi Takeda, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

(*) Notice: Subject to any disclaimer, the term of this patent is extended or adjusted under 35 U.S.C. 154(b) by 0 days.

(21) Appl. No.: 15/762,287

(22) PCT Filed: Sep. 6, 2016

(86) PCT No.: PCT/JP2016/076094
§ 371 (c)(1),
(2) Date: Mar. 22, 2018

(87) PCT Pub. No.: WO2017/051700
PCT Pub. Date: Mar. 30, 2017

(65) Prior Publication Data
US 2019/0074632 A1 Mar. 7, 2019

(30) Foreign Application Priority Data

Sep. 25, 2015 (JP) .................................. 2015-187737

(51) Int. Cl.
*H01R 13/627* (2006.01)
*H01R 13/629* (2006.01)
(Continued)

(52) U.S. Cl.
CPC ............ *H01R 13/629* (2013.01); *B60L 58/10* (2019.02); *H01M 2/10* (2013.01); *H01M 2/20* (2013.01);
(Continued)

(58) Field of Classification Search
CPC .. H01R 13/629; H01R 13/518; H01R 13/502; H01R 25/006; H01R 2201/26;
(Continued)

(56) References Cited

U.S. PATENT DOCUMENTS 4,986,762 A * 1/1991 Keith ................... G02B 6/3823
385/76
D759,596 S * 6/2016 Byrne ....................... D13/137.2
(Continued)

FOREIGN PATENT DOCUMENTS

JP H09-259992 A 10/1997
JP H11-111395 A 4/1999
(Continued)

OTHER PUBLICATIONS

Search Report for PCT/JP2016/076094, dated Dec. 13, 3016.

*Primary Examiner* — Abdullah A Riyami
*Assistant Examiner* — Nelson R. Burgos-Guntin
(74) *Attorney, Agent, or Firm* — Honigman LLP

(57) ABSTRACT

A wire-side connector provided at a terminal end of a wire harness; and a device-side connector that is fittable to the wire-side connector, and is to be disposed on one surface of a device via connector holding portions are included, the connector holding portions being provided so as to be pivotable between a mounting position at which the device- (Continued)

side connector is disposed in an orientation along the one surface of the device with a fitting face of the device-side connector facing forward, and a fitting position at which the device-side connector assumes an orientation intersecting the one surface so that the fitting face is disposed at a position distanced from the one surface.

10 Claims, 21 Drawing Sheets

(51) Int. Cl.
*B60L 58/10* (2019.01)
*H01M 2/10* (2006.01)
*H01M 2/20* (2006.01)
*H01R 13/46* (2006.01)
*H01R 35/04* (2006.01)
*H01R 13/502* (2006.01)
*H01R 13/518* (2006.01)
*H01R 25/00* (2006.01)

(52) U.S. Cl.
CPC ........... *H01R 13/46* (2013.01); *H01R 13/502* (2013.01); *H01R 13/518* (2013.01); *H01R 25/006* (2013.01); *H01R 35/04* (2013.01); *H01M 2220/20* (2013.01); *H01R 2201/20* (2013.01); *H01R 2201/26* (2013.01)

(58) Field of Classification Search
CPC .. H01R 2201/20; B60L 11/1851; H01M 2/20; H01M 2220/20
USPC .................................... 439/540.1, 131, 76.2
See application file for complete search history.

(56) References Cited

U.S. PATENT DOCUMENTS

| 9,429,728 | B2* | 8/2016 | Puetz ................... G02B 6/3897 |
| 9,541,726 | B2* | 1/2017 | Geens ................. G02B 6/4455 |
| 9,568,699 | B2* | 2/2017 | Geens ................. G02B 6/4455 |
| D811,337 | S * | 2/2018 | Byrne ....................... D13/137.2 |
| 2002/0021551 | A1 | 2/2002 | Kashiwagi |
| 2016/0254515 | A1 | 9/2016 | Shimoda et al. |

FOREIGN PATENT DOCUMENTS

| JP | 2003-045596 A | 2/2003 |
| JP | 2013-152918 A | 8/2013 |
| JP | 2015-049931 A | 3/2015 |

* cited by examiner

CONNECTOR MOUNTING STRUCTURE AND CONNECTOR MOUNTING METHOD

CROSS-REFERENCE TO RELATED APPLICATIONS

This application is the U.S. national stage of PCT/JP2016/076094 filed Sep. 6, 2016, which claims priority of Japanese Patent Application No. JP 2015-187737 filed Sep. 25, 2015.

TECHNICAL FIELD

The technique disclosed herein relates to a structure and a method for mounting a pair of mutually fitted connectors so as to be disposed on one surface of a device.

BACKGROUND

For electric cars and hybrid cars, a battery module including a plurality of cells that are connected in alignment is used, and the battery module is provided with a means for detecting the voltages of the cells (see JP 2011-91003A below). Generally, the voltage detection means has a structure in which a harness that binds together voltage detection lines connected to the electrodes of the cells is connected to a control unit via a connector.

For the battery module of this kind as well, there is a need to integrate the module as a whole, including the voltage detection means, in a compact manner. As an example, a battery module having a structure has been proposed in which a control unit is mounted on the upper face of the battery module, and on the other hand, a harness is pulled out from the control unit, and a device-side connector connected to a terminal end of the harness is disposed on a predetermined mounting surface such as a side surface of the battery module, and a wire-side connector connected to a terminal end of the harness of the voltage detection line is fitted to the device-side connector on the mounting surface.

Meanwhile, depending on the type of the battery module, an assembly or reinforcement frame may be disposed so as to extend from an end edge of the mounting surface, for example. In that case, it may not be possible to secure a fitting space for the wire-side connector, on the mounting surface of the device. To deal with this problem, it is conceivable to remove the device-side connector, then fit it to the mating wire-side connector in a state in which the device-side connector is separated from the mounting surface, and thereafter fit the device-side connector to the mounting surface again. However, inevitably, the operation of fitting and mounting the connector, including storing an excess length of the harness, takes time and effort.

The technique disclosed herein has been completed in light of the above-described situation, and it is an object thereof to make the connector mounting portion compact while keeping the connector mounting operation simple.

SUMMARY

A connector mounting structure disclosed herein includes a wire-side connector provided at a terminal end of a wire harness; and a device-side connector that is fittable to the wire-side connector, and is to be disposed on one surface of a device via a connector holding portion, the connector holding portion being provided so as to be pivotable between a mounting position at which the device-side connector is disposed in an orientation along the one surface of the device with a fitting face of the device-side connector facing forward, and a fitting position at which the device-side connector assumes an orientation intersecting the one surface so that the fitting face is disposed at a position distanced from the one surface.

In the case of fitting the connectors to each other, the connector holding portion is pivoted to the fitting position to assume an orientation in which the device-side connector intersects one surface of the device, while the fitting face is brought to a position distanced from the one surface of the device, and the mating wire-side connector is fitted to the device-side connector, using the space forward of the one surface. When the connector holding portion is pivoted to the mounting position after the two connectors have been fitted, the two connectors are disposed in the fitted state along the one surface of the device.

The mounting portion of the connectors can be made more compact, while keeping the operation of fitting and mounting the connectors simple.

The following configurations may also be adopted.

The connector holding portion is provided so as to be pivotable between the mounting position and the fitting position about a shaft disposed rearward of the device-side connector.

By pivoting the connector holding portion at a relatively small pivot angle, the two connectors can be brought to the fitting position at which they can be fitted. The space required forward of the one surface of the device to fit the two connectors can be kept small.

The connector holding portion is provided so as to be pivotable between the mounting position and the fitting position about a shaft disposed laterally to the device-side connector.

If the wire harness pulled out from the device is connected to the device-side connector, an excess length of the wire harness can be kept short.

A resin protector through which a wire harness pulled out from the device is inserted and that is to be disposed on the one surface of the device is provided, the resin protector is provided with a lid portion that is openable and closable through a hinge, and the lid portion constitutes the connector holding portion by which the device-side connector is held.

The pivoting between the fitting position and the mounting position can be achieved through opening and closing the lid portion. The structures of the portions where the connector is fitted and mounted can be made more simple.

The resin protector includes a flat plate-shaped base and a cover that is detachably attached to the base, and the lid portion is provided on the cover so as to be openable and closable.

Since the base and the cover can be divided from each other, the insertion of the wire harness and the operation of mounting the device-side connector to the lid portion can be performed efficiently.

The lid portion is provided with a locking portion capable of locking and releasing the lid portion to and from a closed state.

Releasing and opening the lid portion enables fitting of the two connectors, and closing and locking the lid portion brings the fitted two connectors into a state in which they are mounted along one surface of the device.

A connector mounting method disclosed herein is a connector mounting method wherein a wire-side connector provided at a terminal end of a wire harness; and a device-side connector that is fittable to the wire-side connector, and is to be disposed on one surface of a device via a connector holding portion are included, the connector holding portion being provided so as to be movable between a mounting position at which the device-side connector is disposed in an orientation along the one surface of the device with a fitting face of the device-side connector facing forward, and a fitting position at which the device-side connector assumes an orientation intersecting the one surface so that the fitting face is disposed at a position distanced from the one surface, the method including: fitting the wire-side connector to the device-side connector in a state in which the connector holding portion is pivoted to the fitting position, and thereafter pivoting the connector holding portion to the mounting position.

Advantageous Effects of Invention

According to the technique disclosed herein, it is possible to make the connector mounting portion more compact, while keeping the connector mounting operation simple.

DETAILED DESCRIPTION OF PREFERRED EMBODIMENTS

Embodiment

Figure 20:
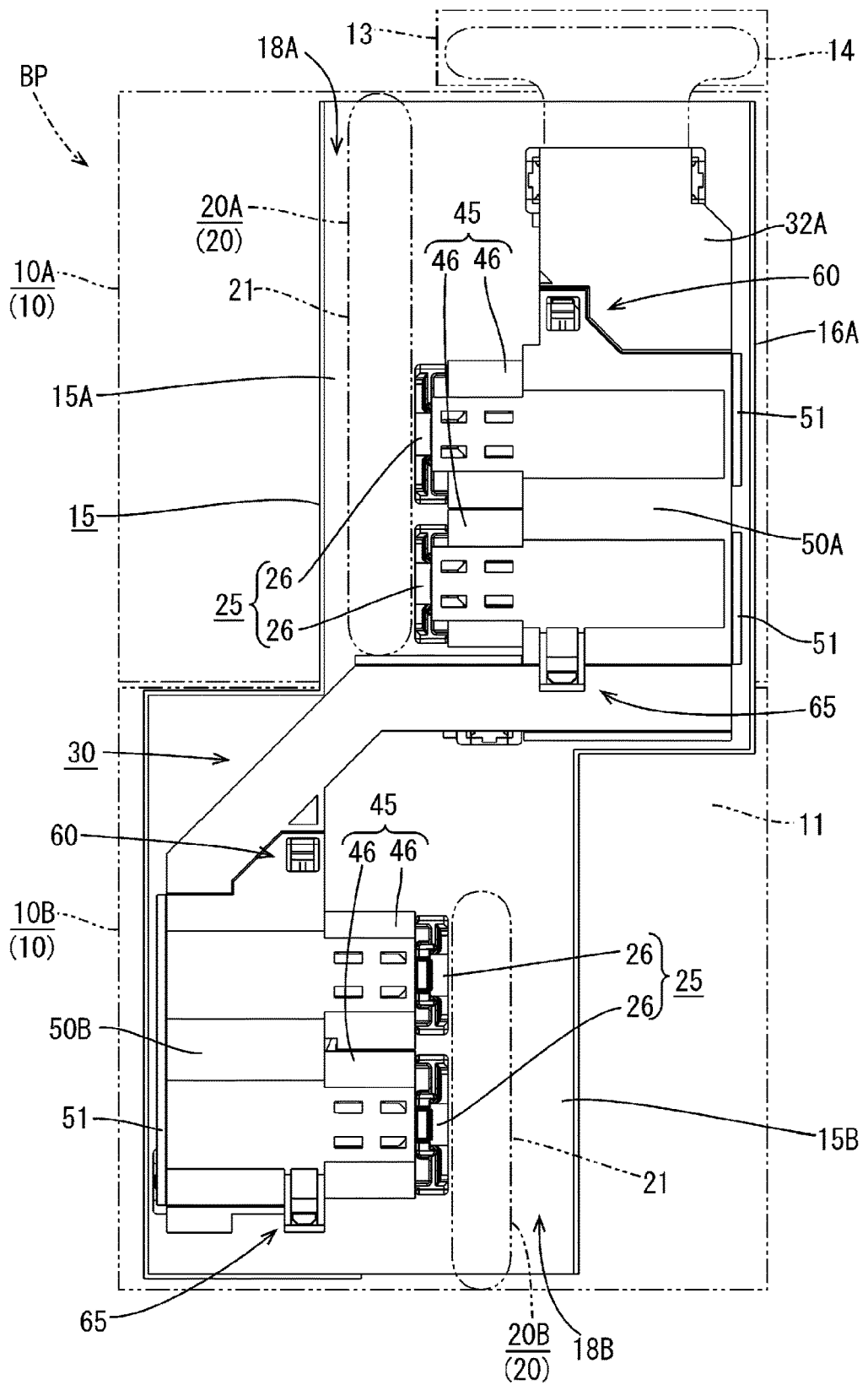
FIG. 20 is a front view of the same.
Figure 21:
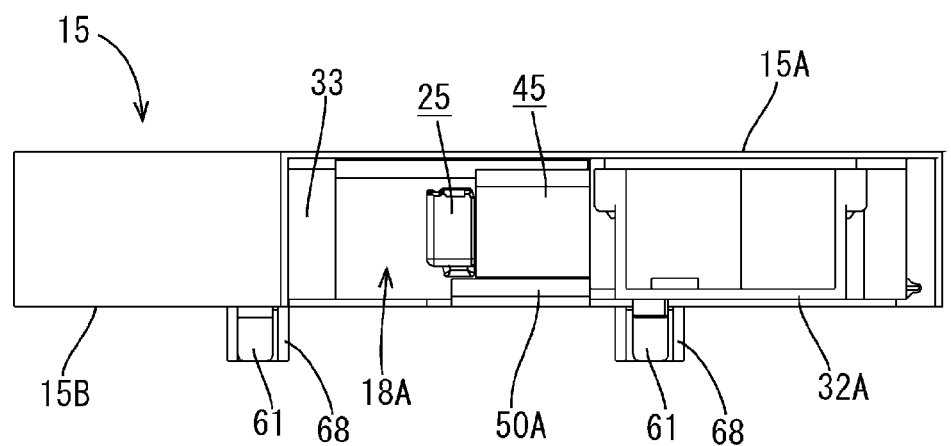
FIG. 21 is a plan view of the same.

In the following, an embodiment applied to a connector mounting portion of a battery pack BP will be described with reference to FIGS. 1 to 21.
As shown in FIG. 20, a battery pack BP of the present embodiment has a structure in which battery modules 10 each including a plurality of cells that are connected in alignment are stacked in two levels, and an ECU 13 (Electronic Control Unit) that manages and controls the voltages or the like of the cells is mounted onto the upper face of a battery module 10A in the upper level.

Figure 1:
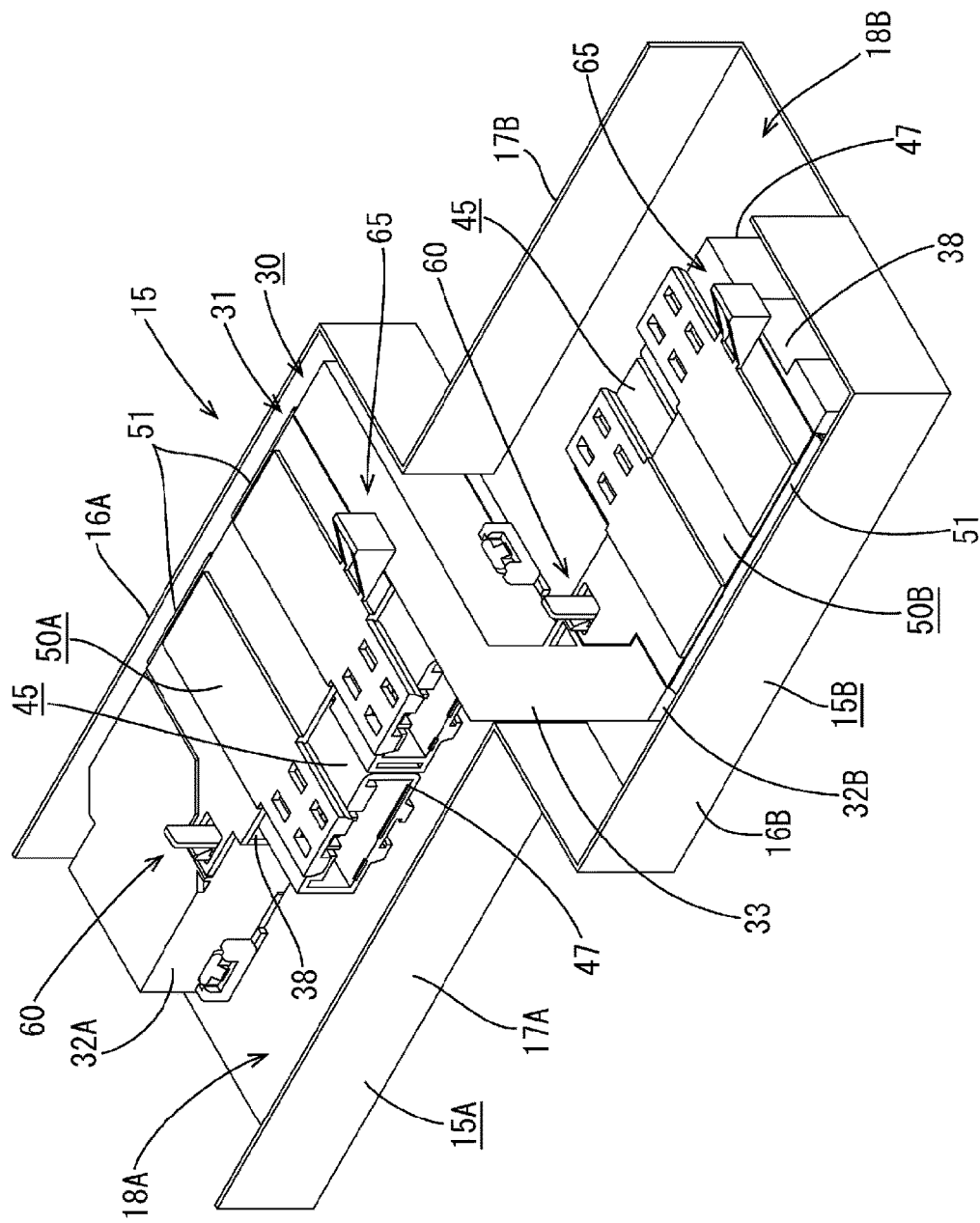
FIG. 1 is a perspective view showing a state in which an ECU-side harness body is mounted to a bracket according to an embodiment.
Figure 2:
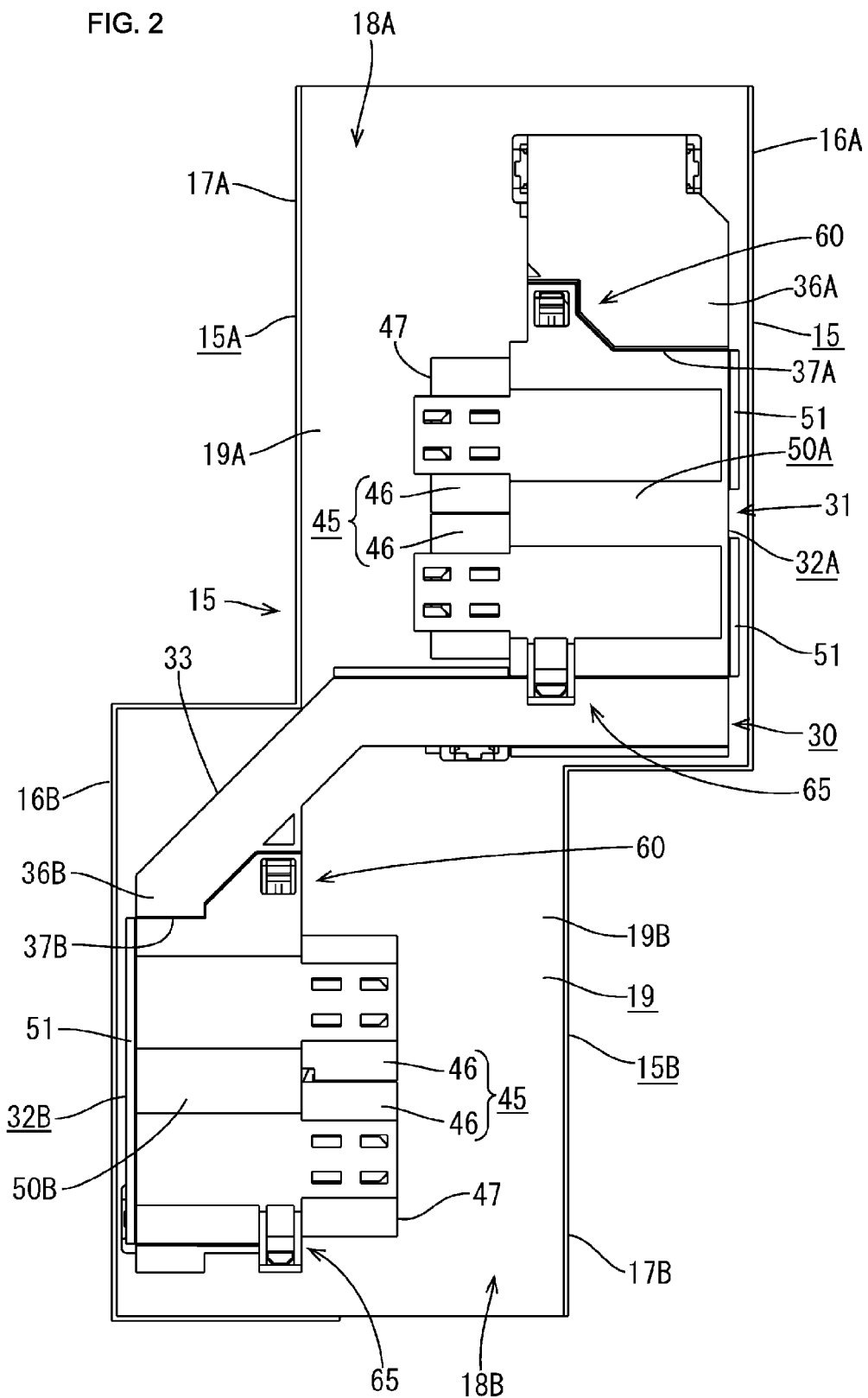
FIG. 2 is a front view of the same.
Figure 3:
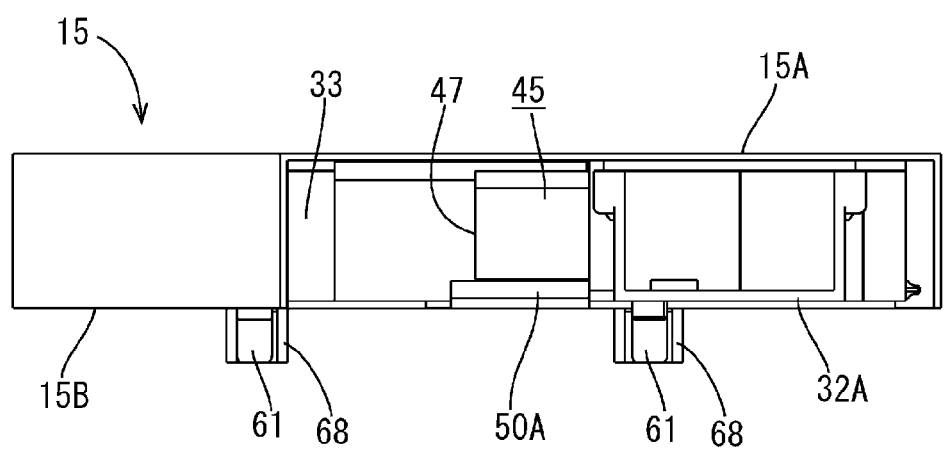
FIG. 3 is a plan view of the same.
Figure 4:
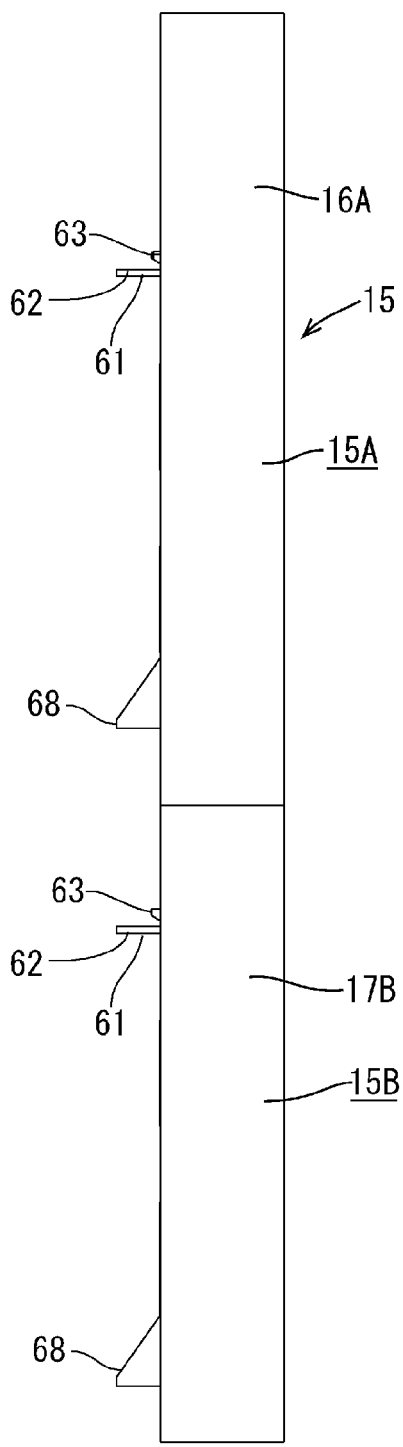
FIG. 4 is a side view of the same.
Figure 5:
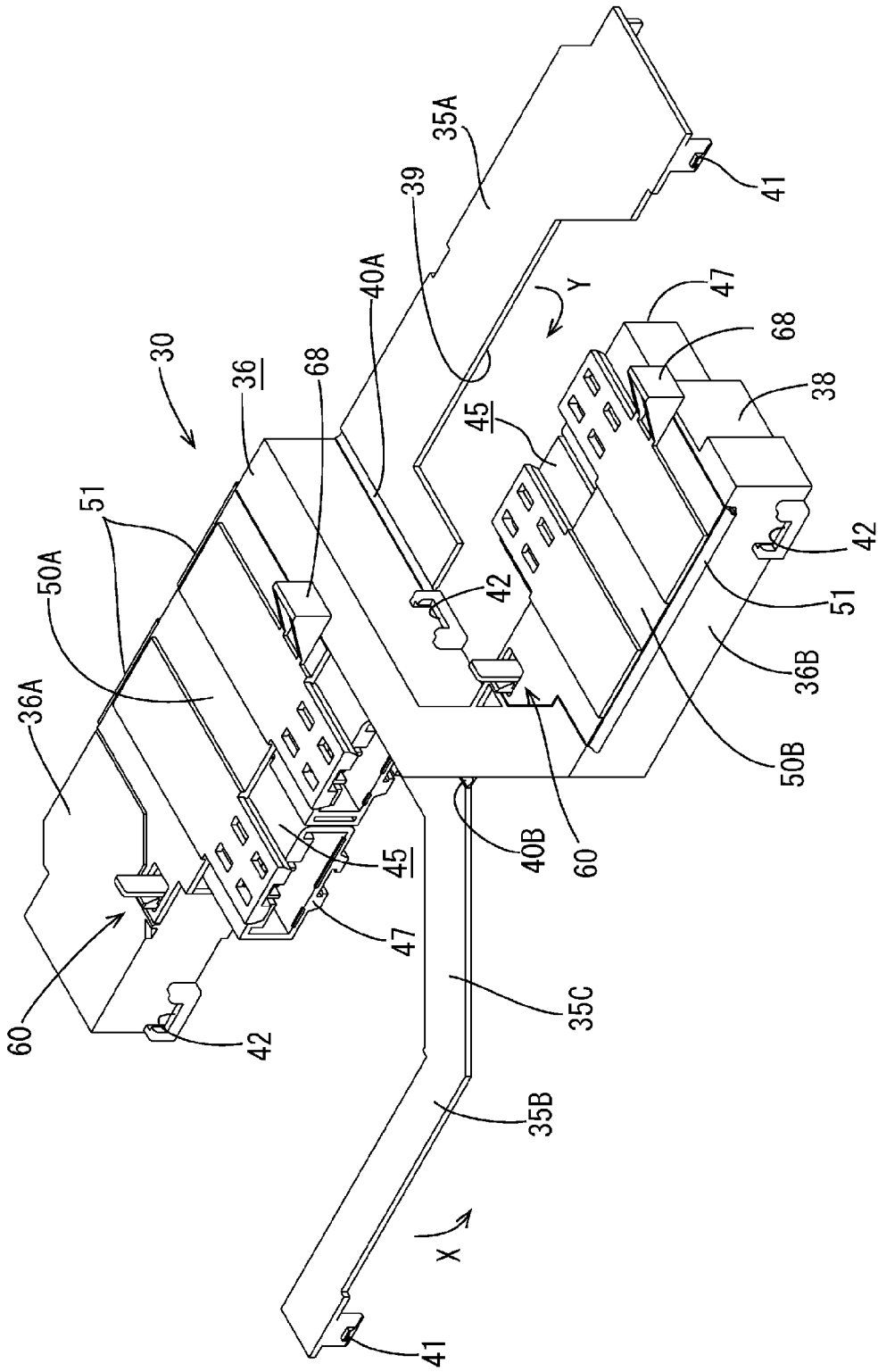
FIG. 5 is a perspective view showing a state of the ECU-side harness body before assembly.
Figure 6:
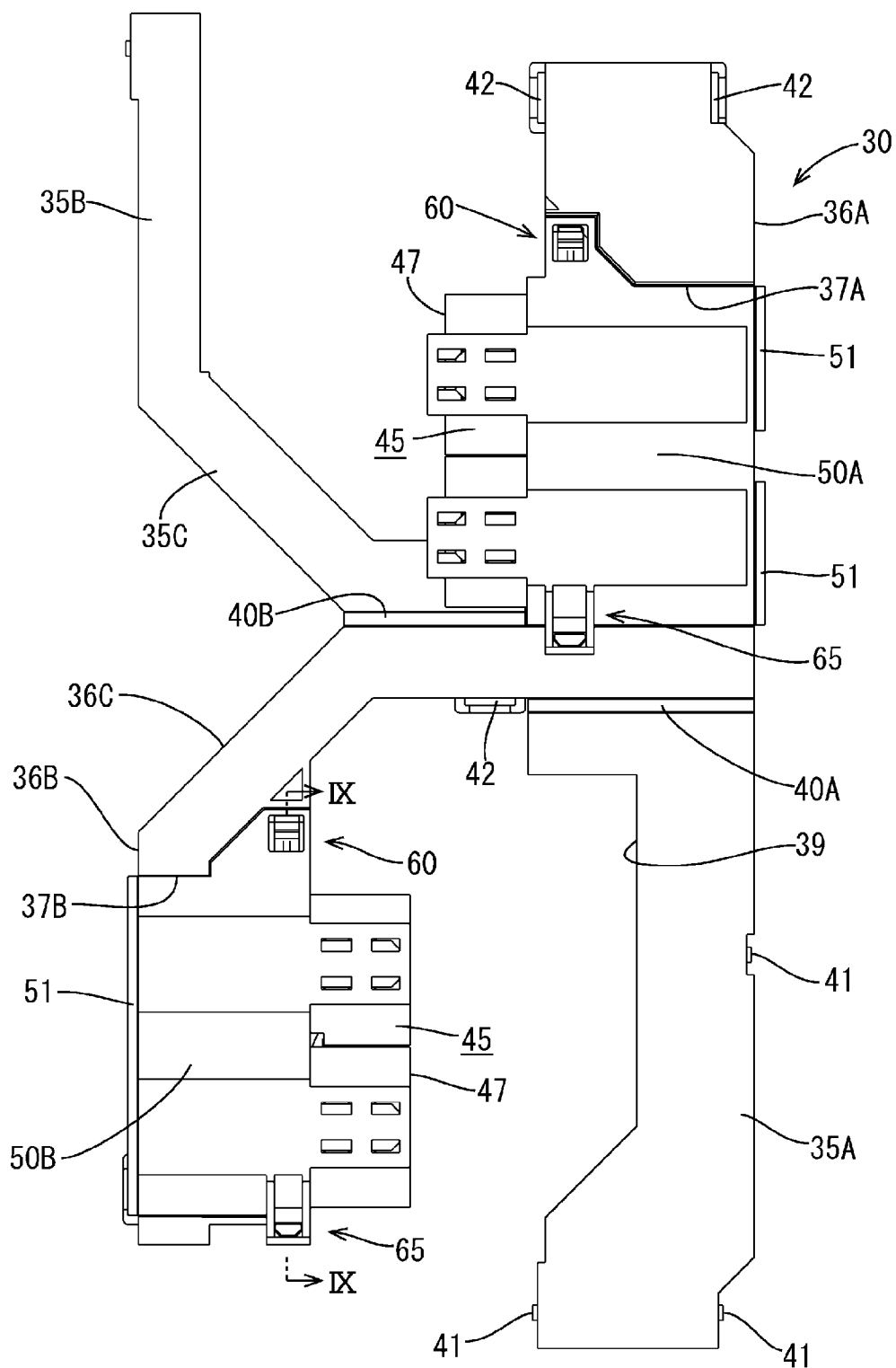
FIG. 6 is a front view of the same.

As shown in the drawing, the schematic structure of a voltage detection portion is as follows. Wire-side connectors 25 respectively provided on battery-side harness bodies 20A and 20B that have been pulled out from the battery modules 10A and 10B, and device-side connectors 45 provided in an ECU-side harness body 30 connected to the ECU 13 are mounted so as to be fitted to each other on a side surface 11 that is located on the front side of and extending over the upper and lower battery modules 10A and 10B.
The fitting between the wire-side connector 25 and the device-side connector 45, and the mounting structure will now be described.
Also, as shown in FIG. 20, a bracket 15 that serves, for example, to couple the two battery modules 10A and 10B is provided on the side surface 11 extending over the upper and lower battery modules 10A and 10B. The bracket 15 is formed in the shape of a substantially vertically elongated, shallow dish, and an upper portion 15A (hereinafter referred to as the "upper bracket 15A") and a lower portion 15B (hereinafter referred to as the "lower bracket 15B") together define a continuous shape whose center width position is offset by a little less than a half-width in the left-right direction. The upper end face of the bracket 15 is open across the entire width, and the lower end face thereof is open at the right end portion in front view. A bottom surface 19 of the bracket 15 corresponds to "one surface of a device" of the technique disclosed herein.
A battery-side harness body 20 will now be described. One battery-side harness body 20 is provided for each of the upper and lower battery modules 10A and 10B. Specifically, a plurality of voltage detection lines that are connected to and pulled out from the electrodes or the like of the cells constituting the battery modules 10A and 10B are bound together, and harnesses thereof (not shown) are inserted in a resin protector 21. The resin protector 21 is formed into the shape of a flexible tube as a result of performing compression molding on a non-woven fabric or the like. However, at a distal end portion thereof, a hard portion is formed by increasing the degree of compression.
Meanwhile, a wire-side connector 25 (configured by two housings 26 that are disposed in parallel) on the male side is connected to a terminal end of each of the harnesses. The wire-side connector 25 is mounted to the hard portion located at the distal end of the resin protector 21.
The battery-side harness body 20A of the battery module 10A in the upper level is routed by being bent so as to hang from the upper face of the battery module 10A, along a bottom surface 19A of the upper bracket 15A in the bracket 15. The wire-side connector 25 provided at the hanging end of the battery-side harness body 20A assumes an orientation in which the fitting face thereof faces right in FIG. 20, on the bottom surface 19A of the upper bracket 15A.
The battery-side harness body 20B of the battery module 10B in the lower level is routed by being bent so as to rise from the lower face of the battery module 10B, along a bottom surface 19B of the lower bracket 15B. The wire-side connector 25 provided at the rising end of the battery-side harness body 20B assumes an orientation in which the fitting face thereof faces left in the drawing, on the bottom surface 19B of the lower bracket 15B.
Next, the ECU-side harness body 30 will be described. As shown in FIGS. 1 to 3, the ECU-side harness body 30 is a single harness body to which the above-described two battery-side harness bodies 20A and 20B are both connected, and includes two, namely, long and short harnesses (not shown) that are connected to and pulled out from the ECU 13, a resin protector 31 through which the two harnesses are inserted, and device-side connectors 45 connected to terminal ends of the harnesses.

As shown in FIG. 2, the ECU-side harness body 30 is disposed so as to hang along a location toward the right side edge of the bottom surface 19A of the upper bracket 15A in the bracket 15, be bent obliquely left and downward, and thereafter hang along a location toward the left side edge of the bottom surface 19B of the lower bracket 15B.

The resin protector 31 is formed in a cross-sectionally square tubular shape as a whole, and is composed of, as shown in the drawing, a wide upper insertion portion 32A disposed on the bottom surface 19A of the upper bracket 15A along the right side surface, a narrow lower insertion portion 32B disposed on the bottom surface 19B of the lower bracket 15B along the left side surface, and a communication portion 33 protruding leftward from the lower edge of the upper insertion portion 32A, and thereafter extending obliquely left and downward so as to be in communication with the upper end of the lower insertion portion 32B.

Generally, the resin protector 31 is configured to be formed in the above-described square tubular shape by attaching a cross-sectionally gate-shaped cover 36 to a flat plate-shaped base 35. As shown in FIGS. 5 to 8, the cover 36 is formed as one unit from the upper insertion portion 32A to the lower insertion portion 32B, whereas the base 35 is divided at a joint between the upper insertion portion 32A and the communicating portion 33.

Figure 7:
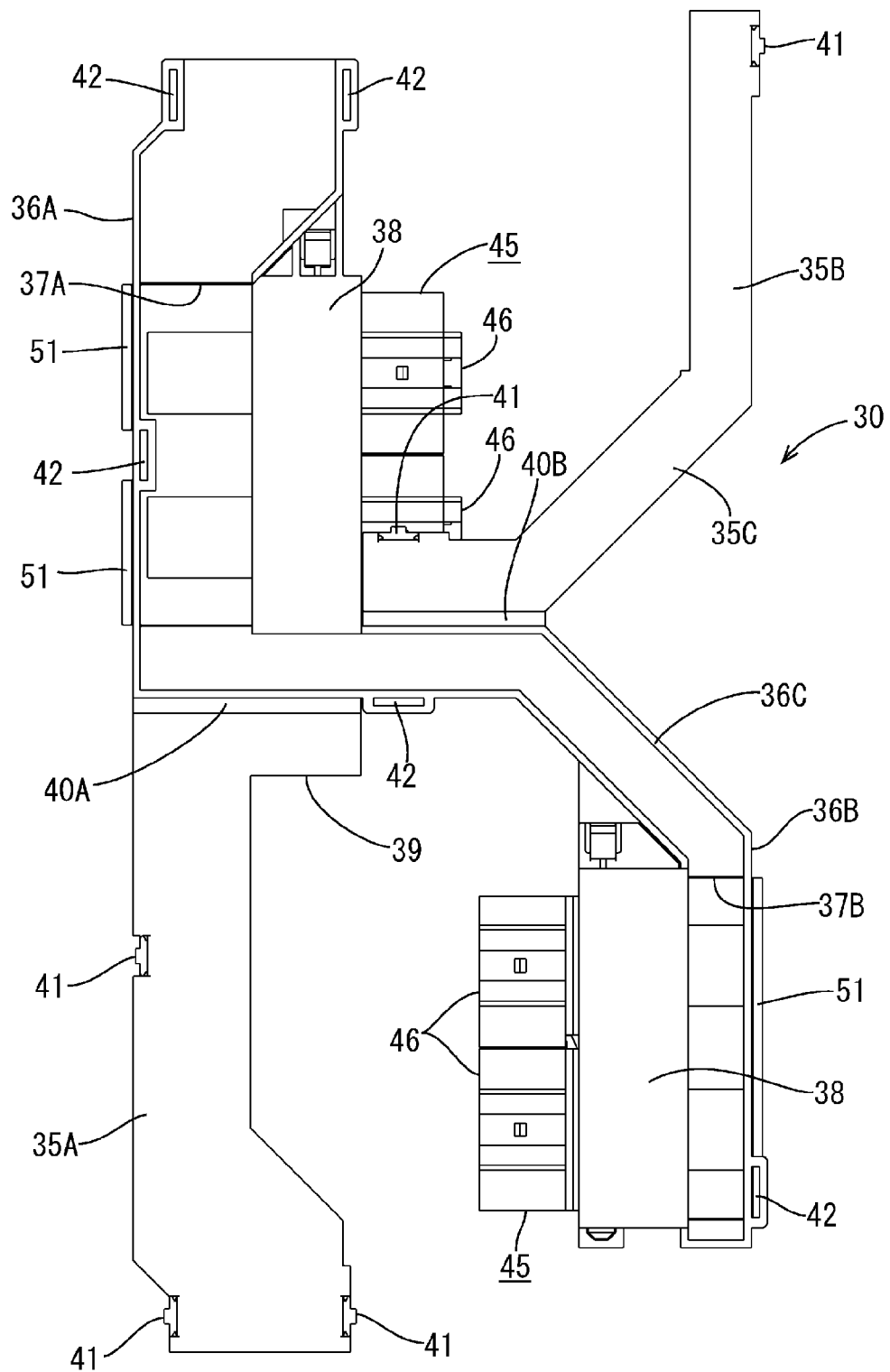
FIG. 7 is a rear view of the same.
Figure 8:
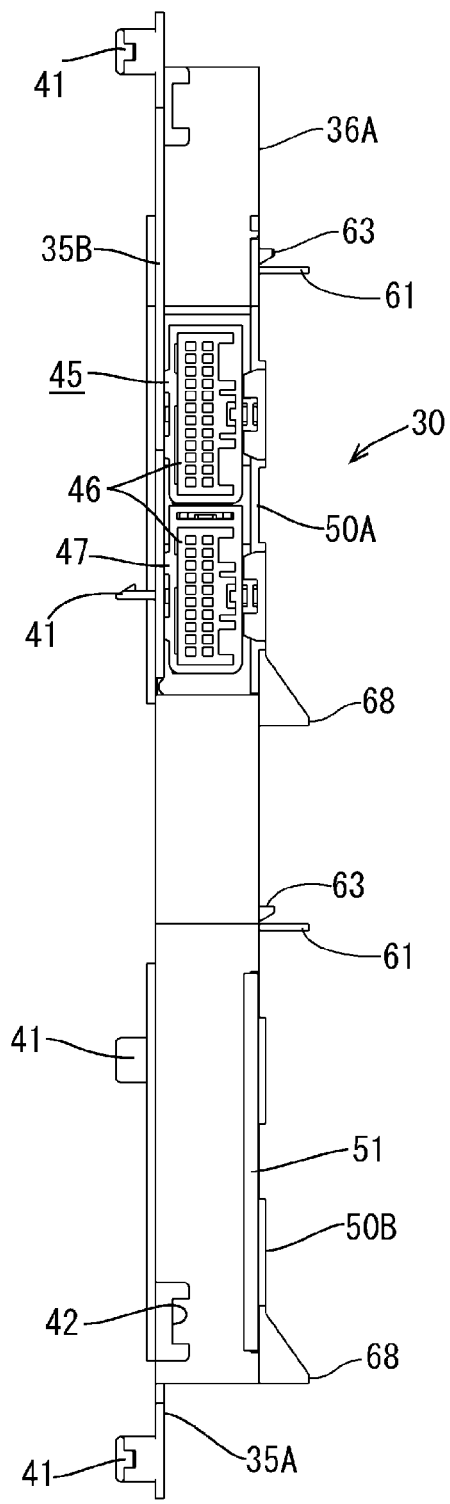
FIG. 8 is a side view of the same.
Figure 11:
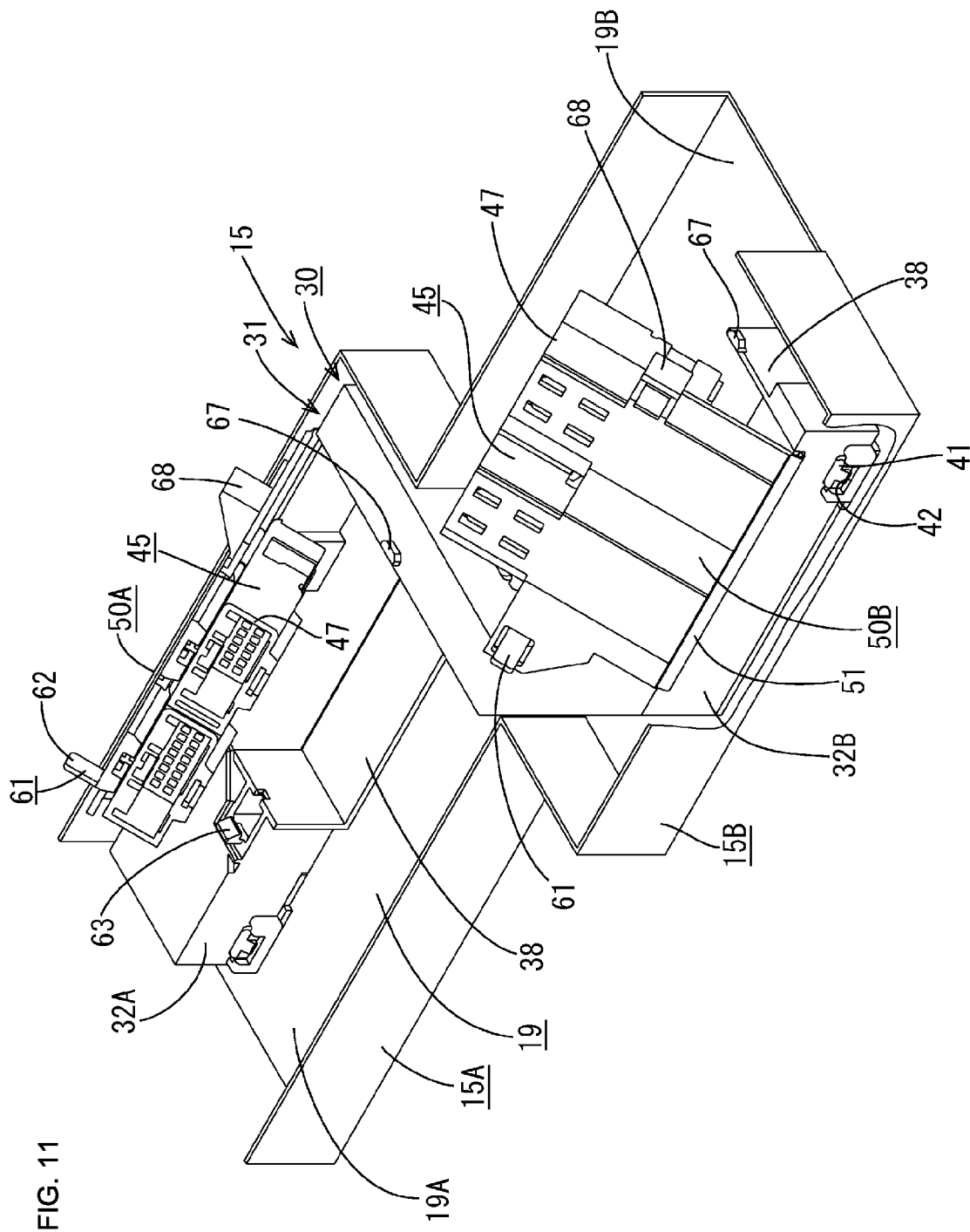
FIG. 11 is a partially cut-out perspective view of a state in which a device-side connector is pivoted to a fitting position.
Figure 12:
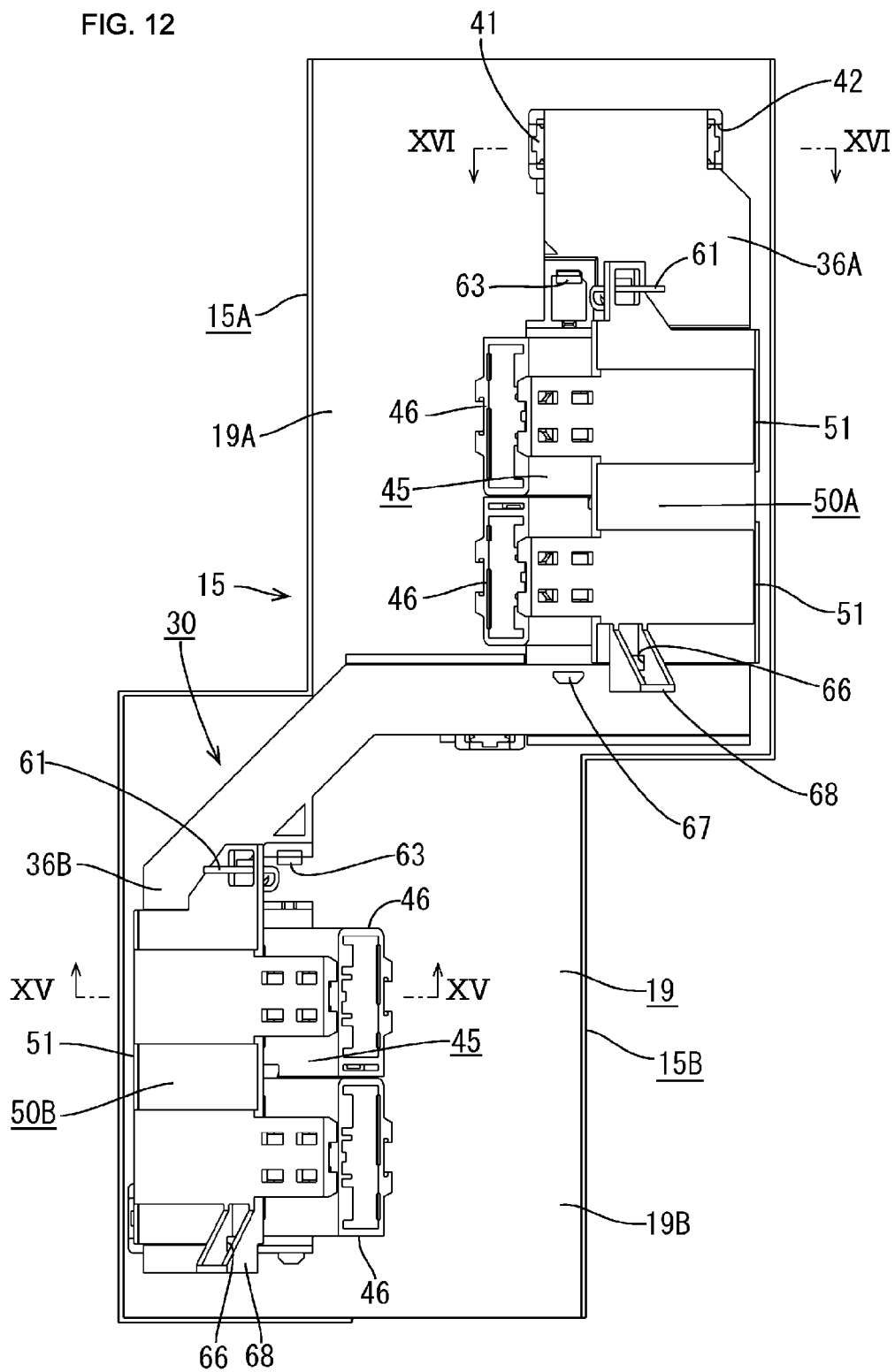
FIG. 12 is a front view of the same.

More specifically, as shown in FIGS. 7 and 11, in an upper cover 36A, the top plate is cut away in a predetermined height region located toward the lower end, thus forming an opening 37A. Additionally, the right side surface shown in FIG. 7 is open in the height region, and a groove-shaped storage plate 38 open in the left-right direction is formed on the opening face so as to extend inward (leftward in FIG. 7), as shown in FIG. 11. On the other hand, a cut-out portion 39 to which the bottom surface of the storage plate 38 is fitted for escape is formed on the upper base 35A. The upper end face of the upper cover 36A is open across the entire width thereof.

As shown in FIG. 7, in the lower cover 36B, the top plate is open across substantially the entire height (an opening 37B). In addition, the left side face is open, and the groove-shaped storage plate 38 open in the left-right direction is formed on the opening face so as to extend outward, opposite from the above-described upper cover 36A. At an upper end portion of the lower cover 36B, a communicating portion cover 36C is formed in communication therewith, and the lower end face of the lower cover 36B is closed.

Figure 10:
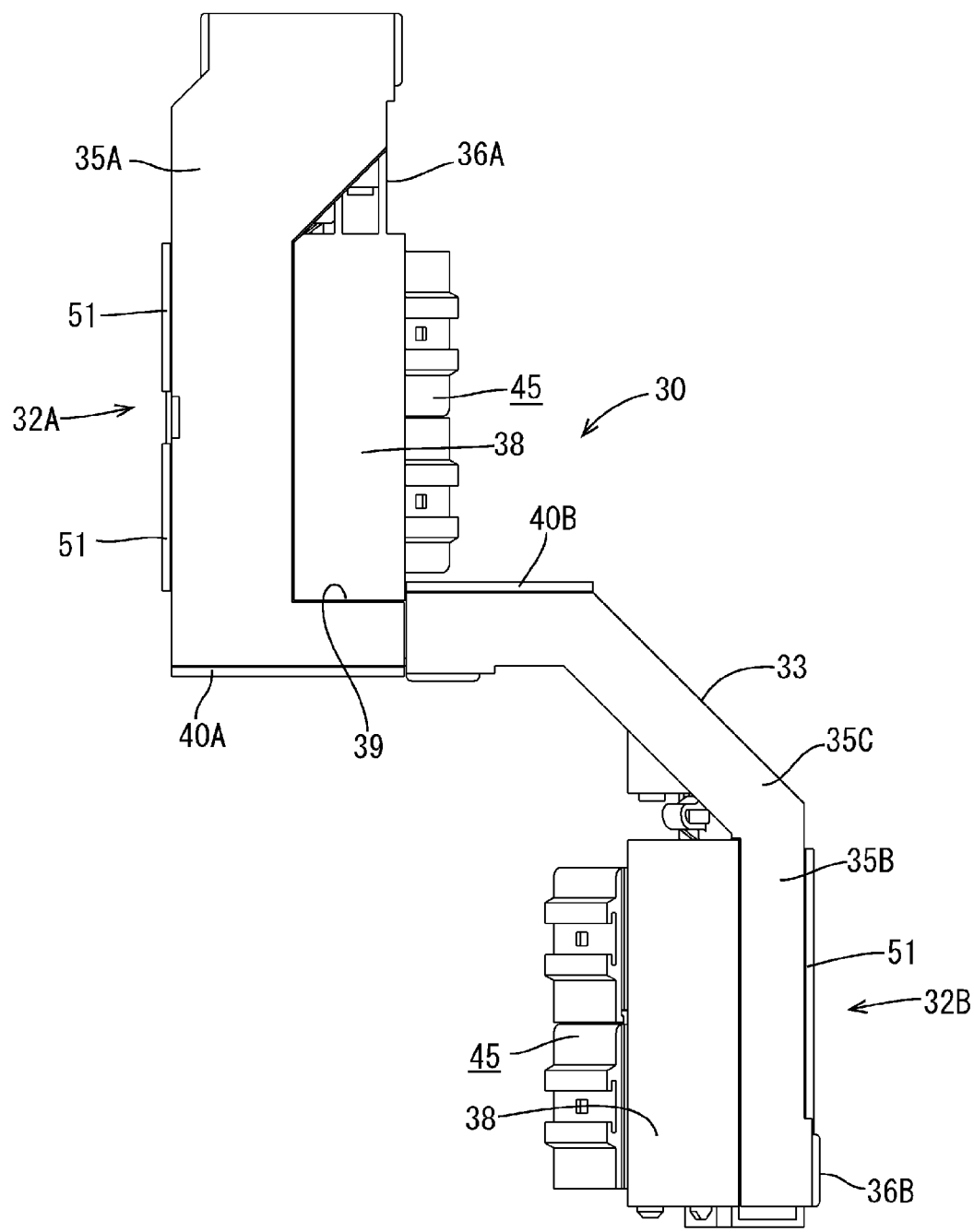
FIG. 10 is a rear view of the ECU-side harness body.

The upper base 35A is formed so as to be pivotable around a hinge portion 40A provided at a proximal end edge, in order to open and close the opening face of the upper cover 36A. The upper base 35A is pivoted, from the open state shown in FIG. 5, in the direction indicated by the arrow Y shown in the drawing. When the upper base 35A is pivoted 180°, the upper base 35A closes the opening face of the upper cover 36A, while the storage plate 38 is fitted to the cut-out portion 39 for escape, as shown in FIG. 10.

Figure 16:
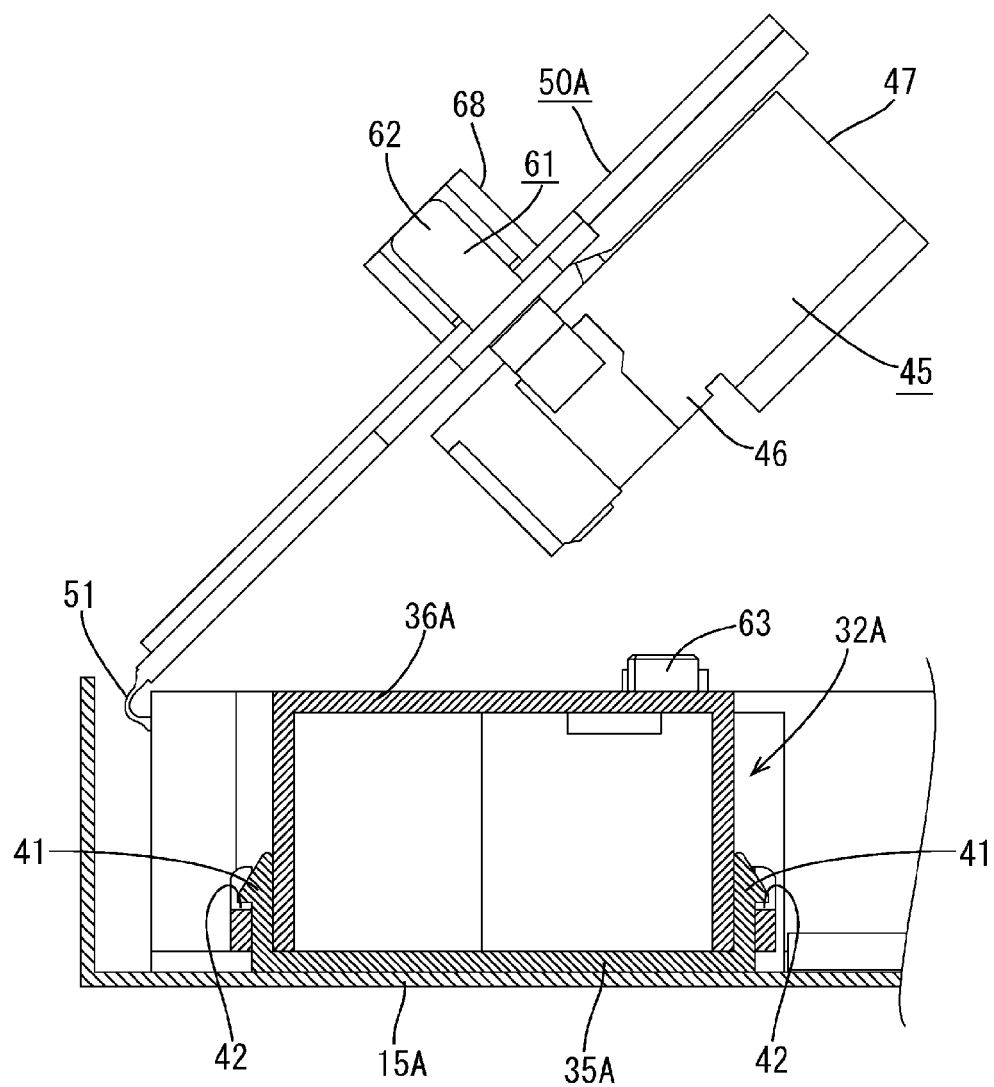
FIG. 16 is an enlarged cross-sectional view taken along the line XVI-XVI in FIG. 12.

At this time, as shown in FIG. 16, insertion pieces 41 provided at three locations, namely, at left and right sides and a side edge portion, of the pivot end of the upper base 35A are inserted and locked to insertion recessed portions 42 provided so as to correspond to left and right outer faces and a side edge of the distal end portion of the upper cover 36A, and thereby, the upper base 35A is held in the closed state. Consequently, the upper insertion portion 32A, having a relatively wide square shape, is formed.

The lower base 35B is formed so as to be pivotable around a hinge portion 40B provided along an integrally formed communicating portion base 35C, in order to open and close the opening face of the lower cover 36B. The lower base 35B is pivoted, from the open state shown in FIG. 5, in the direction indicated by the arrow X shown in the drawing. When the lower base 35B is pivoted 180°, the lower base 35B closes the opening face of the lower cover 36B, while the communicating portion base 35C closes the opening face of the communicating portion cover 36C, as shown in FIG. 10.

At this time, as shown in FIG. 7, insertion pieces 41 provided in two locations, namely, at the pivot end of the lower base 35B and the coupling portion base 35, are inserted and locked to insertion recessed portions 42 corresponding to the outer surface of the lower cover 36B and the coupling portion cover 36C, and thus, the lower base 35B is held in the closed state. Consequently, as shown in FIG. 10, the lower insertion portion 32B, having a relatively narrow square shape, is formed, along with the communicating portion 33.

Although the details will be described later, of the two, namely, long and short harnesses that are pulled out from the ECU 13 described above, the longer harness is configured to be inserted through the upper insertion portion 32A, the communicating portion 33, and the lower insertion portion 32B of the resin protector 31, whereas the shorter harness is configured to be inserted only through the upper insertion portion 32A, together with the longer harness.

The mounting structure of the device-side connectors 45 will now be described. Two, namely, upper and lower device-side connectors 45 are provided, and each of the device-side connectors 45 has a configuration in which two male housings 46 are disposed in parallel, and constitute a male-side connector that is fittable to a wire-side connector 25 described above, as shown in FIG. 15.

Figure 13:
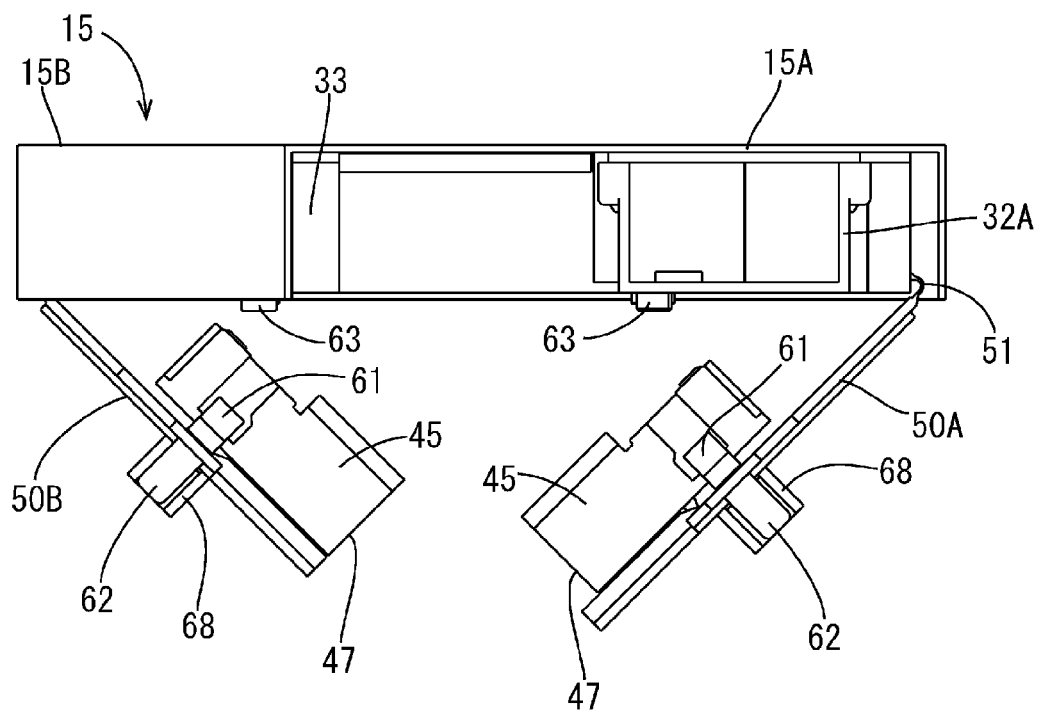
FIG. 13 is a plan view of the same.
Figure 14:
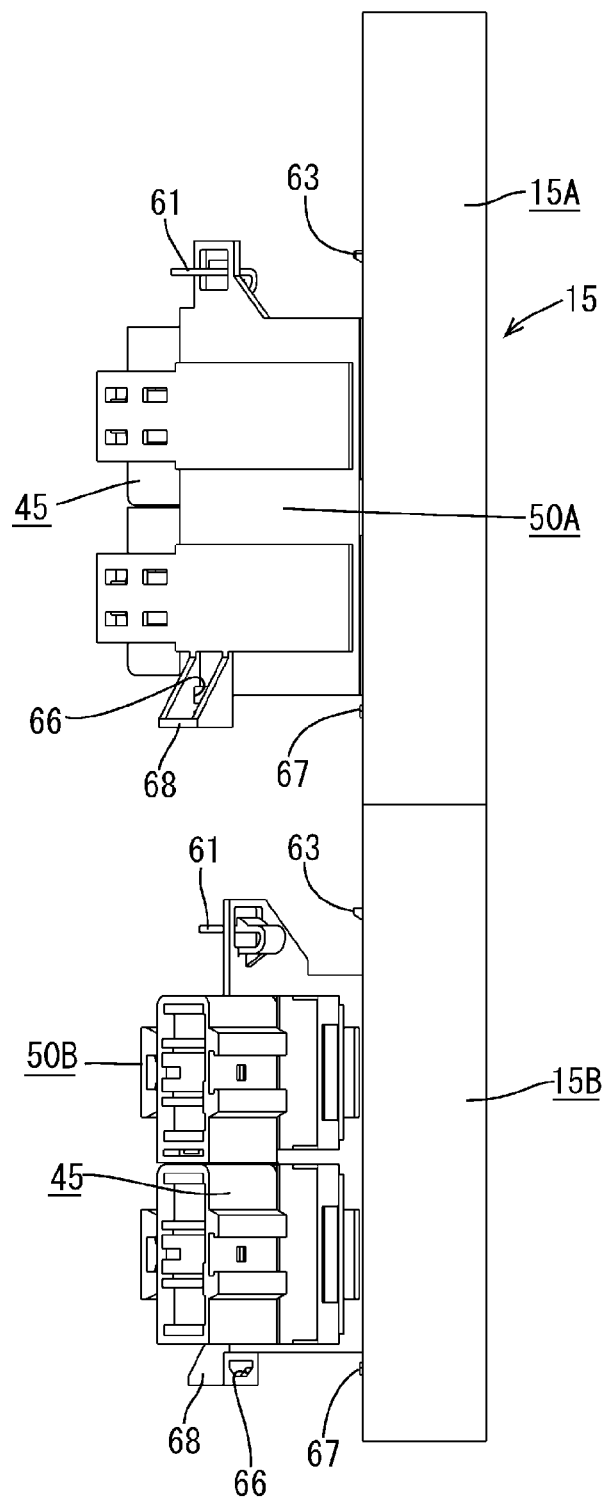
FIG. 14 is a side view of the same.
Figure 15:
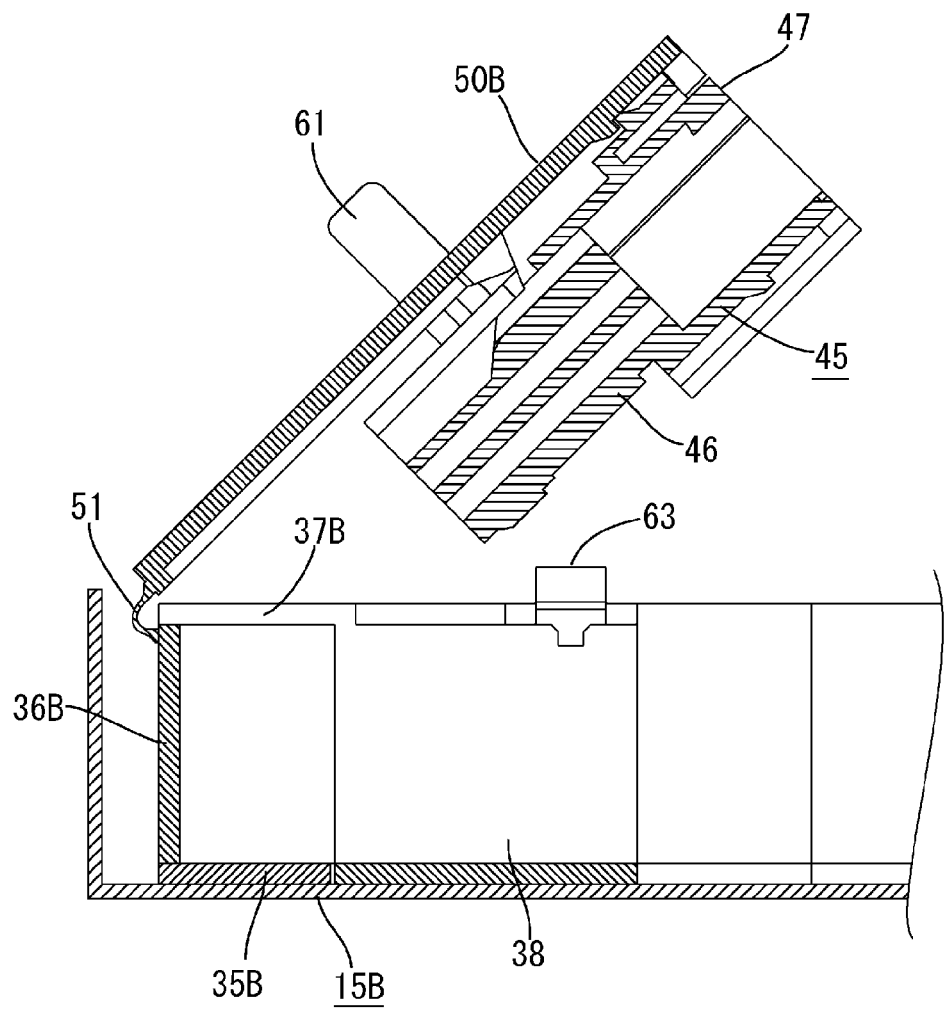
FIG. 15 is an enlarged cross-sectional view taken along the line XV-XV in FIG. 12.

In the upper cover 36A constituting the upper insertion portion 32A of the resin protector 31, the opening 37A is formed in the top plate as previously described, and a lid portion 50A (corresponding to the connector holding portion) for opening and closing the opening 37A is provided so as to be pivotable around a hinge portion 51 provided at the right side edge in FIG. 2 of the opening 37A, as shown in FIGS. 2 and 13. A part of the pivot end of the lid portion 50A is formed so as to pass above the storage plate 38 and to further extend to the outer side thereof, and one of the device-side connectors 45 is mounted onto the back face of the lid portion 50A, at a position located toward the pivot end, in an orientation in which a fitting face 47 faces outward.

In the lower cover 36B constituting the lower insertion portion 32B, the opening 37B is formed in the top plate extending across substantially the entire length as previously described, and a lid portion 50B (corresponding to the connector holding portion) for opening and closing the opening 37B is provided so as to be pivotable around a hinge portion 51 provided at the left side edge in FIG. 2. A part of the pivot end of the lid portion 50B is formed so as to pass above the storage plate 38 and to further extend to the outer side thereof, and the other device-side connector 45 is mounted onto the back face of the lid portion 50B, at a position located toward the pivot end, in an orientation in which the fitting face 47 faces outward, as shown in FIG. 13.

As described above, of the two harnesses that are connected to the ECU 13, the shorter harness is inserted through the upper insertion portion 32A of the resin protector 31, and a terminal end thereof is connected to the device-side connector 45 provided at the lid portion 50A of the upper insertion portion 32A. Specifically, male terminals connected to terminal ends of the wires constituting the harnesses are housed in alignment in the male housings 46.

The other, or the longer harness passes through the upper insertion portion 32A and the communicating portion 33 of the resin protector 31 so as to be inserted through the lower insertion portion 32B, and a terminal end thereof is connected to the device-side connector 45 provided at the lid portion 50B of the lower insertion portion 32B.

Note that the other terminal end of each of the two harnesses is connected to another connector (not shown) at a location protruding from the upper insertion portion 32A of the resin protector 31.

The lid portions 50A and 50B are provided with a locking means for locking the lid portions 50A and 50B in the closed state. The locking means has a structure common to the two lid portions 50A and 50B. When a description is given of the two lid portions 50A and 50B, including the locking means, the lid portions 50A and 50B may be referred to as the "lid portion 50" where appropriate.

Figure 9:
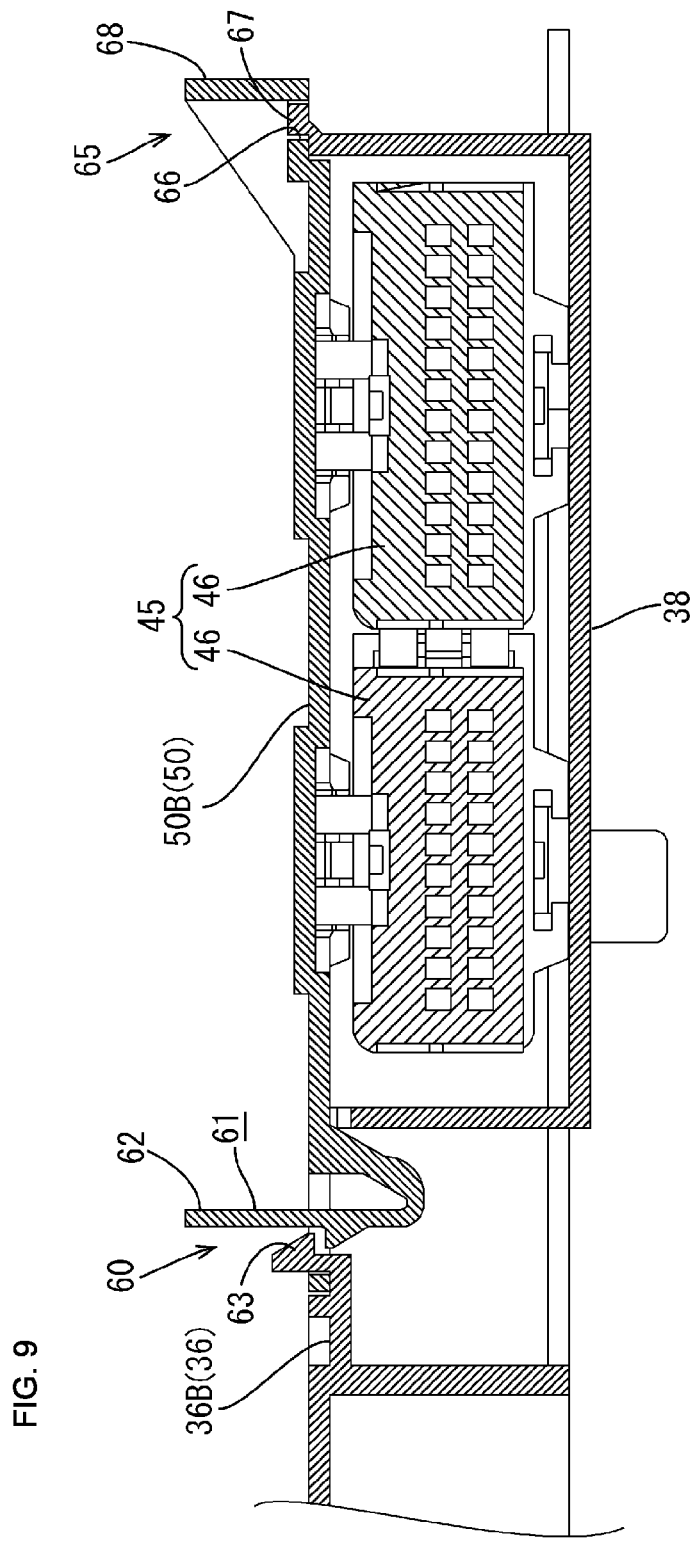
FIG. 9 is an enlarged cross-sectional view taken along the line IX-IX in FIG. 6.

As shown in FIG. 2, a locking portion 60 and a positioning portion 65 are set at upper and lower side edge portions of the lid portion 50. As shown in FIG. 9, the locking portion 60 is configured by providing, at the upper edge (the left side edge in the drawing) of the lid portion 50, a locking piece 61 that is elastically locked to a locking protrusion 63 provided on the cover 36 side. The distal end of the locking piece 61 protrudes above the lid portion 50 as an operation portion 62.

The positioning portion 65 is configured by providing, at the lower edge (the right side edge in FIG. 9) of the lid portion 50, a fitting hole 66 to which a fitting protrusion 67 provided on the cover 36 (the storage plate 38 on the lower side) is fitted. At the position of the lid portion 50 at which the fitting hole 66 is formed, a grip portion 68 is formed so as to oppose the operation portion 62 of the locking piece 61 described above.

As shown in FIG. 9, upon closing the lid portion 50, the locking piece 61 is locked by being elastically locked to the locking protrusion 63, while being positioned by the positioning portion 65. When the lid portion 50 is closed, the device-side connector 45 on the upper side is configured to be stored in the storage plate 38, and to assume an orientation in which the fitting face 47 extends along the bottom surface 19A of the upper bracket 15A with the right side facing forward, as shown in FIGS. 1 and 2.

Similarly, the device-side connector 45 on the lower side is configured to be stored in the storage plate 38, and to assume an orientation in which the fitting face 47 extends along the bottom surface 19B of the lower bracket 15B with the right side facing forward.

On the other hand, from the closed state of the lid portion 50 shown in FIG. 9, when the locking piece 61 is forcefully bent elastically with a finger hooked between the operation portion 62 and the grip portion 68 of the locking piece 61, the lid portion 50 is unlocked, and thus can be opened by subsequently pulling up the locking piece 61 forward. At this time, the device-side connector 45 mounted onto the back face of the lid portion 50 is configured to assume an orientation in which the fitting face 47 faces in an oblique direction intersecting the bottom surface 19 of the bracket 15, as shown in FIG. 13.

Next, an example of the assembly procedure of the battery pack BP, including the mounting of the connectors 25 and 45, will be described.

For the upper and lower battery modules 10A and 10B, the battery-side harness bodies 20A and 20B are formed in the previously described manner, and are pulled out forward. The battery modules 10A and 10B are stacked in two levels, and are coupled via the bracket 15 or the like. The ECU 13 is placed on and attached to the upper faces of the battery modules 10A and 10B in the upper level.

Along with this, the ECU-side harness body 30 is assembled. The device-side connectors 45 are respectively connected to terminal ends of the two long and short harnesses. The resin protector 31 is brought into a state in which the base 35 and the cover 36, as well as the two lid portions 50 are open, and the shorter harness is fitted into the upper cover 36, while the device-side connector 45 at the terminal end is mounted onto the back face of the lid portion 50A on the upper side. On the other hand, the longer harness is fitted over the upper cover 36A, the communicating portion cover 36C, and the lower cover 36B, while the device-side connector 45 at the terminal end is mounted onto the back face of the lid portion 50B on the lower side.

Thereafter, the upper and lower bases 35A and 35B are folded back from the hinge portions 40A and 40B, and the openings of the corresponding covers 36A and 36B are closed and coupled. Also, the two lid portions 50A and 50B are closed to be temporarily locked in the closed state. Along with this, another connector for connection to the ECU 13 is provided at terminal ends of the two long and short harnesses that protrude from the upper insertion portion 32A.

This completes the assembly of the ECU-side harness body 30.

The ECU-side harness body 30 assembled in this manner is disposed in the orientation shown in FIG. 2 on the bottom surface 19 of the bracket 15 disposed on the side surface 11 that is on the front side of the battery modules 10A and 10B, and is fixed through adhesion or the like. On the other hand, the connector connected to the other terminal end of each of the two harnesses is fitted to a connector provided at a connection port of the ECU 13, and a portion around the fitting portion is covered with another resin protector 31, as shown in FIG. 20.

When the ECU-side harness body 30 is fixed to the bottom surface 19 of the bracket 15, the upper insertion portion 32A of the resin protector 31 is disposed on the bottom surface 19A of the upper bracket 15A at a position located toward a right side wall 16A, as shown in FIGS. 1 and 2. The device-side connector 45 provided on the back face of the lid portion 50A of the upper insertion portion 32A assumes an orientation in which the fitting face 47 thereof faces left in FIG. 2. A storage space 18A having a predetermined width is secured between the fitting face 47 of the device-side connector 45 and a left side wall 17A of the upper bracket 15A.

On the other hand, the lower insertion portion 32B of the resin protector 31 is disposed on the bottom surface 19B of the lower bracket 15B at a position located toward a left side wall 16B, and the device-side connector 45 provided on the back face of the lid portion 50B of the lower insertion portion 32B assumes an orientation in which the fitting face 47 faces right in the drawing. A storage space 18B having a predetermined width is secured between the fitting face 47 of the device-side connector 45 and the right side wall 17B of the lower bracket 15B.

When fitting the corresponding wire-side connector 25 to the device-side connector 45, fitting is performed in the following manner.

From the state shown in FIGS. 2 and 9, the lid portions 50A and 50B that have been closed are unlocked. Specifically, the lid portions 50A and 50B are unlocked by elastically bending the locking piece 61 forcefully with a finger hooked between the operation portion 62 of the locking piece 61 and the grip portion 68 provided opposite thereto. Accordingly, by pulling the finger forward while gripping, the lid portions 50A and 50B are pivoted about the hinge portion 51 so as to open (fitting position), as shown in FIG. 13. At the fitting position, the device-side connector 45 mounted onto the back face of the lid portion 50A on the upper side can assume an oblique orientation (at any angle) in which the fitting face 47 faces obliquely left on the forward side, in front view. On the other hand, the device-side connector 45 mounted onto the back face of the lid portion 50B on the lower side can assume an oblique orientation (at any angle) in which the fitting face 47 faces obliquely right on the forward side, in front view.

Figure 17:
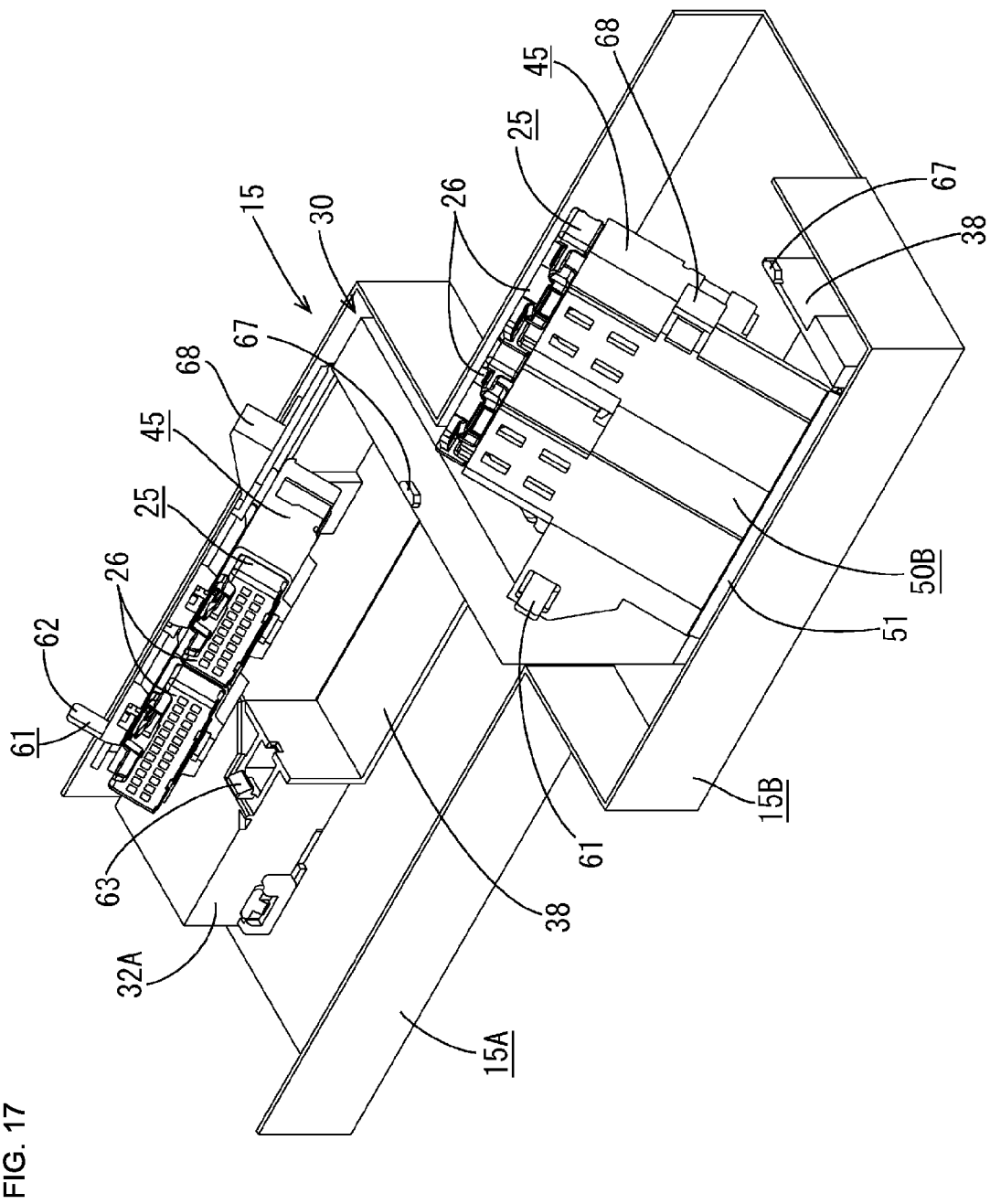
FIG. 17 is a perspective view of a state in which the wire-side connector is fitted to the device-side connector.
Figure 18:
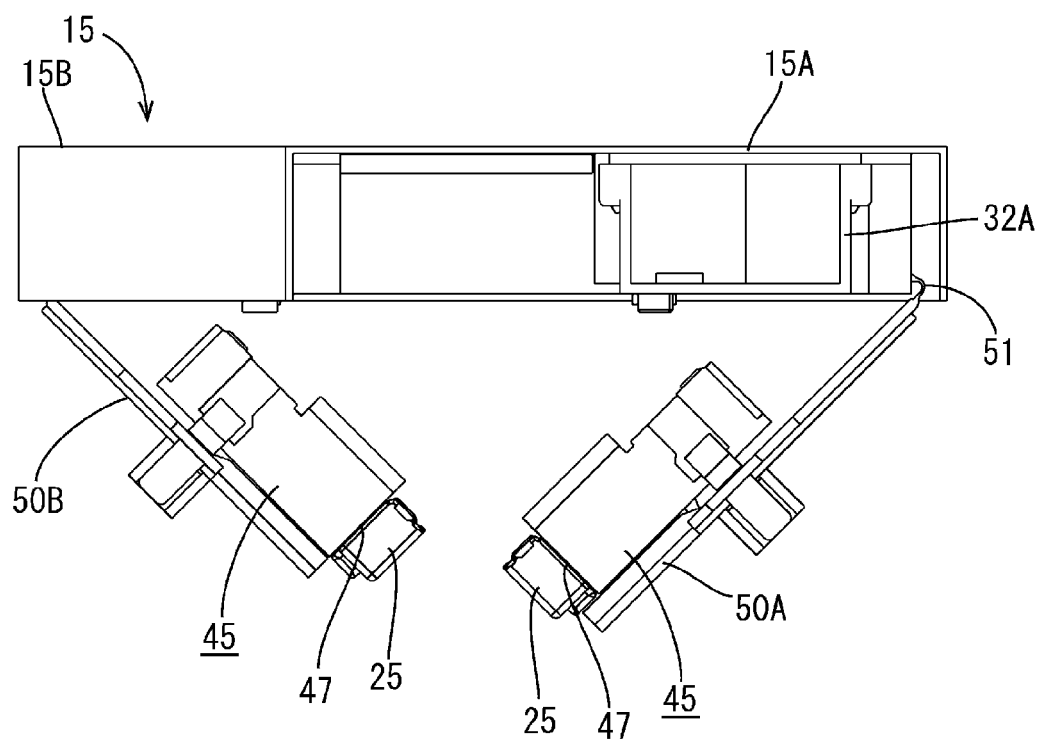
FIG. 18 is a plan view of the same.
Figure 19:
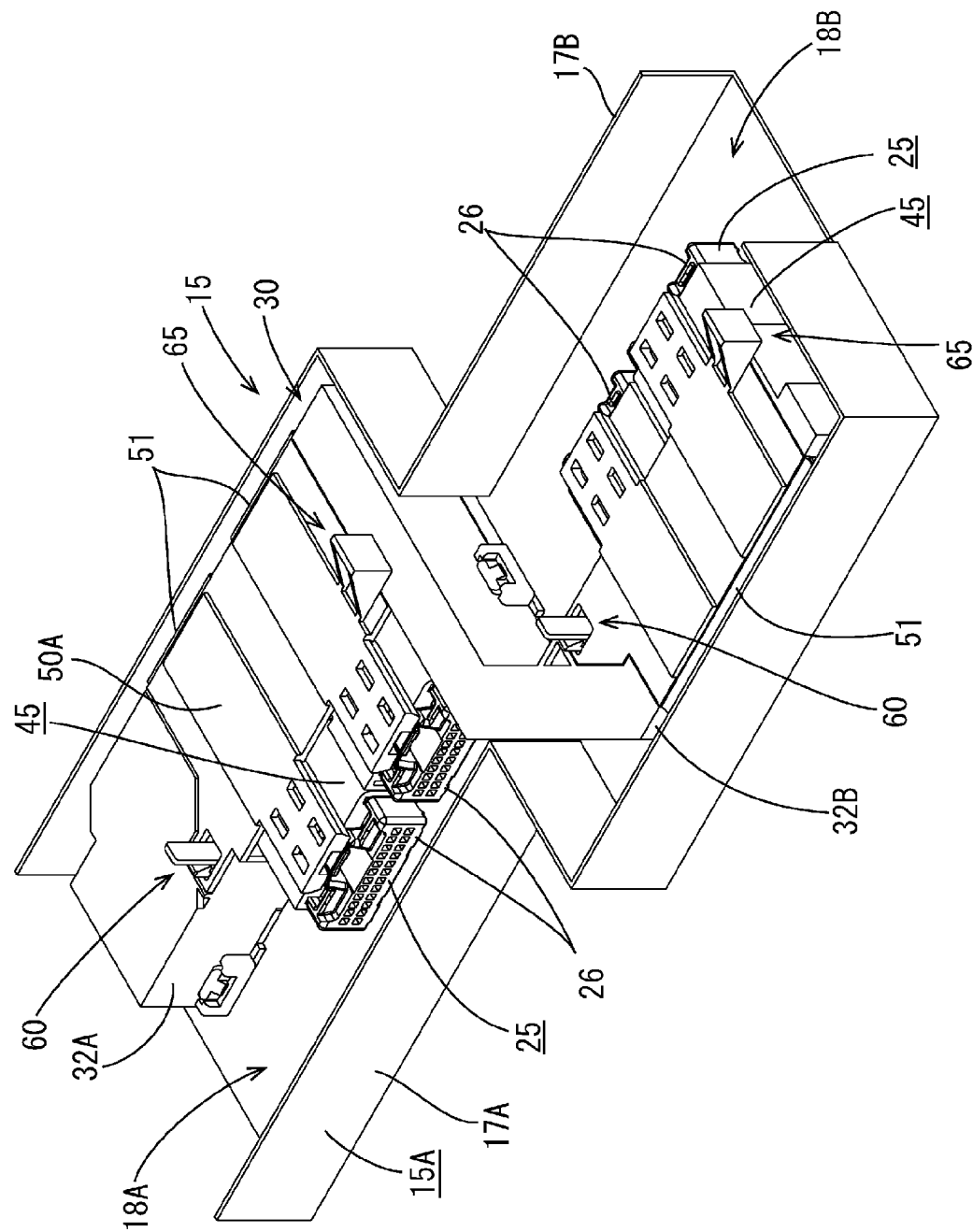
FIG. 19 is a perspective view of a state in which the connectors are mounted onto a bracket after being fitted.

When the lid portion 50 is opened so that the device-side connector 45 can assume the oblique orientation, the battery-side harness body 20A on the upper side is pulled out in an oblique orientation in which the hanging end thereof is distanced from the bottom surface 19A of the upper bracket 15A, in a forward direction. Thereafter, as shown in FIGS. 17 and 18, the wire-side connector 25 provided at the hanging end is fitted to the mating device-side connector 45 on the upper side, using the space forward of the upper bracket 15A.

Likewise, the battery-side harness body 20 on the lower side is pulled out in an oblique orientation in which the rising end thereof is distanced from the bottom surface 19B of the lower bracket 15B, in a forward direction. Thereafter, the wire-side connector 25 provided at the rising end is fitted to the mating device-side connector 45 on the lower side, using the space forward of the lower bracket 15B.

After the fitting between the paired connectors 25 and 45 is complete, the battery-side harness bodies 20A and 20B are stored in the storage spaces 18A and 18B, respectively, while the upper and lower lid portions 50A and 50B are each pivoted about the hinge portions 51 so as to be closed, and are locked in the closed state by the locking portion 60, as shown in FIG. 20. When the two lid portions 50 are locked at the closed position (mounting position), the pair of connectors 25 and 45 fitted to each other are disposed in an orientation along the bottom surface 19 of the bracket 15, on the back face sides of the lid portions 50. Thus, a voltage detection means is constructed.

That is, the device-side connector 45 and the wire-side connector 25 that are mutually fitted to construct the voltage detection means are mounted, together with the ECU-side harness body 30 and the battery-side harness body 20, in substantially flat contact with the bottom surface 19 of the bracket 15, within the narrow bracket 15 provided on the side surface 11 on the forward side of the battery module 10.

According to the present embodiment, various effects as described below can be achieved.

In the present embodiment, the voltage detection means is constructed by the device-side connector 45 pulled out from the ECU 13 and the wire-side connector 25 pulled out from the battery modules 10A and 10B being fitted and connected, whereas the device-side connector 45 and the wire-side connector 25 that are mutually fitted are mounted, together with the ECU-side harness body 30 and the battery-side harness body 20, in substantially flat contact with the bottom surface 19 of the bracket 15 within the narrow bracket 15 disposed on one side surface 11 of the battery module 10. As a result, the entire battery pack BP can be made more compact.

In the step of fitting and mounting the two connectors 25 and 45, the lid portion 50 is opened to bring the device-side connector 45 into an oblique orientation intersecting the bottom surface 19 of the bracket 15, and the fitting face 47 is brought to a position distanced by an appropriate distance from the bottom surface 19 of the bracket 15. The mating wire-side connector 25 is fitted to the device-side connector 45, using the space forward of the bracket 15, and thereafter, the lid portion 50 is closed, and thus, the two connectors 25 and 45 are disposed in the fitted state along the bottom surface 19 of the bracket 15. That is, the operation of fitting and mounting the connectors 25 and 45 can also be easily performed.

The device-side connector 45 of the present embodiment is disposed on the bottom surface 19 of the bracket 15 via the ECU-side harness body 30 in a configuration in which it is connected to a terminal end of a wire harness pulled out from the ECU 13. Specifically, the ECU-side harness body 30 has a configuration in which the resin protector 31 through which the wire harness is inserted and that is to be disposed on the bottom surface 19 of the bracket 15 is included, the lid portion 50 that is pivotably openable and closable around the hinge portions 51 is provided in the resin protector 31, and the device-side connector 45 is held by the lid portion 50. Accordingly, movement between the fitting position and the mounting position can be achieved through opening and closing the lid portion 50. The fitting between the connectors 25 and 45 and the structure of the mounting portion can be simplified.

In particular, the lid portion 50 is provided so as to be pivotable between the mounting position and the fitting position about the hinge portions 51 provided at rear ends located rearward of the device-side connectors 45, respectively. Therefore, by pivoting the lid portion 50 at a relatively small pivot angle, a device-side connector 45 can be brought to a position at which it can be fitted to the mating wire-side connector 25. Accordingly, the space required forward of the bracket 15 to fit the two connectors 25 and 45 can be kept small.

The resin protector 31 is composed of the flat plate-shaped base 35 and the cross-sectionally gate-shaped cover 36 that is detachably attached to the base 35, and the lid portion 50 is provided on the cover 36 so as to be openable and closable.

Since the base 35 and the cover 36 can be divided from each other, the insertion of the wire harness can be easily performed. Moreover, since the lid portion 50 can be opened and closed, the operation of mounting the device-side connectors 45 to the lid portion 50 can be performed more easily.

The locking portion 60 capable of locking and releasing the lid portion 50 in and from the closed state is attached to the lid portion 50 holding the device-side connector 45. Releasing and opening the lid portion 50 allows the two connectors 25 and 45 to be fitted, and closing and locking the lid portion 50 brings the fitted two connectors 25 and 45 into a state in which they are automatically mounted along the bottom surface 19 of the bracket 15. The operation of fitting and mounting the connectors 25 and 45 can be performed very easily.

Other Embodiments

The technology disclosed herein is not limited to the embodiment described by the above statements and drawings, and, for example, the following embodiments also fall within the technical scope.

In the above-described embodiment, the lid portion (connector holding portion) holding the device-side connector is provided so as to be pivotable about a hinge portion, or a so-called vertical shaft, provided at the rear edge of the lid portion located rearward of the device-side connector as the pivot structure. However, instead of this, it is also possible to adopt a structure in which the lid portion is provided pivotable between the mounting position and the fitting position about a hinge portion, or in other words, a horizontal shaft, provided at a lateral edge of the lid portion that is located laterally to the device-side connector.

With this structure, in order for the entire fitting face of the device-side connector to be distanced from the bottom surface of the bracket in the forward direction so as to be fitted to the mating wire-side connector, the lid portion needs to be pivoted at a large angle such as 90 degrees so as to assume an orientation in which the device-side connector forms a right angle to the bottom surface of the bracket, for example. Accordingly, as illustrated in the above-described embodiment, a little extra space needs to be secured forward of the bracket device-side connector in order to fit the two connectors, as compared with a structure in which it is sufficient to flip the lid portion obliquely upward.

However, for a terminal end of the wire harness pulled out from the ECU and connected to the device-side connector, the terminal end of the wire harness is bent and routed so as to extend along the rear face of the device-side connector. Thus, when the lid portion is pivoted, the terminal end of the wire harness routed along the rear face of the device-side connector can be pivoted integrally with the device-side connector, thus achieving an advantage in that there is no need to provide an excess length for the terminal end of the wire harness.

(2) It is possible to adopt a structure in which the lid portion is formed separately from the resin protector, and provided so as be pivotable by being retrofitted.

(3) Although the lid portion including the resin protector is applied as the connector holding portion in the above-described embodiment, the connector holding portion may be provided separately from the resin protector.

(4) The connector holding portion may be configured to be temporarily locked when moved to the fitting position.

(5) Although the above-described embodiment illustrates a case where the resin protector is composed of the base and the cover, it may be formed as an integrated body.

(6) The above-described embodiment illustrates a case where the placement of the bracket is the main cause of not being able to secure fitting space between the device-side connector and the wire-side connector, on the mounting surface that is one surface of the device. However, there is no limitation with regard to the main cause of inhibition of fitting. For example, the main cause may be that a protrusion obstructing the fitting between the connectors is provided on the mounting surface.

(7) The embodiment illustrates a case where the technique disclosed herein is applied to a battery pack. However, the technique is not limited thereto, and is widely applicable to all structures in which a device-side connector connected to a device and a wire-side connector provided at a terminal end of a wire harness are mounted in the fitted state on a predetermined mounting surface of the device.

The invention claimed is:

1. A connector mounting structure comprising:
a connector unit having a wire harness connecting surface and a device connecting surface disposed on a top surface of the connector unit, the device connecting surface being orthogonal to the wire harness connecting surface, the wire harness connecting surface configured to receive a wire-side connector provided at a terminal end of a wire harness and the device-side connector is coupled to the wire-side connector; and
a bracket having a connector holding portion, the connector holding portion is configured to hold the connector unit so as to be pivotable between a mounting position and a fitting position, wherein in the mounting position, the connector unit is pressed against a bottom surface of the bracket and in the fitting position, the connector unit is spaced apart from the bottom surface of the bracket so as to expose the wire-side harness connector for connection with the wire harness.

2. The connector mounting structure according to claim 1, wherein
the connector holding portion is provided so as to be pivotable between the mounting position and the fitting position about a shaft disposed rearward of the device-side connector.

3. The connector mounting structure according to claim 1, wherein
the connector holding portion is provided so as to be pivotable between the mounting position and the fitting position about a shaft disposed laterally to the device-side connector.

4. The connector mounting structure according to claim 1, wherein
a resin protector through which a wire harness pulled out from the device is inserted and that is to be disposed on the bottom surface of the bracket is provided, the resin protector is provided with a lid portion that is openable and closable around a hinge, and the lid portion constitutes the connector holding portion by which the device-side connector is held.

5. The connector mounting structure according to claim 4, wherein
the resin protector includes a flat plate-shaped base and a cover that is detachably attached to the base, and the lid portion is provided on the cover so as to be openable and closable.

6. The connector mounting structure according to claim 4, wherein
the lid portion is provided with a locking portion capable of locking and releasing the lid portion to and from a closed state.

7. A connector mounting method wherein
providing a connector unit having a wire harness connecting surface and a device connecting surface disposed on a top surface of the connector unit, the device connecting surface being orthogonal to the wire harness connecting surface, the wire harness connecting surface configured to receive a wire-side connector provided at a terminal end of a wire harness; and
providing a bracket having a connector holding portion, the connector holding portion is configured to hold the connector unit so as to be pivotable between a mounting position and a fitting position, wherein in the mounting position, the connector unit is pressed against a bottom surface of the bracket and in the fitting position, the connector unit is spaced apart from the bottom surface of the bracket,
the method comprising:
fitting the wire-side connector to the connector unit so as to couple the wire-side connector to the device-side connector when the connector unit is in the fitting position, and thereafter pivoting the connector holding portion to the mounting position.

8. The connector mounting structure according to claim 2, wherein
   a resin protector through which a wire harness pulled out from the device is inserted and that is to be disposed on the bottom surface of the bracket is provided, the resin protector is provided with a lid portion that is openable and closable around a hinge, and the lid portion constitutes the connector holding portion by which the device-side connector is held.

9. The connector mounting structure according to claim 3, wherein
   a resin protector through which a wire harness pulled out from the device is inserted and that is to be disposed on the bottom surface of the bracket is provided, the resin protector is provided with a lid portion that is openable and closable around a hinge, and the lid portion constitutes the connector holding portion by which the device-side connector is held.

10. The connector mounting structure according to claim 5, wherein the lid portion is provided with a locking portion capable of locking and releasing the lid portion to and from a closed state.

\* \* \* \* \*